Figure 1:
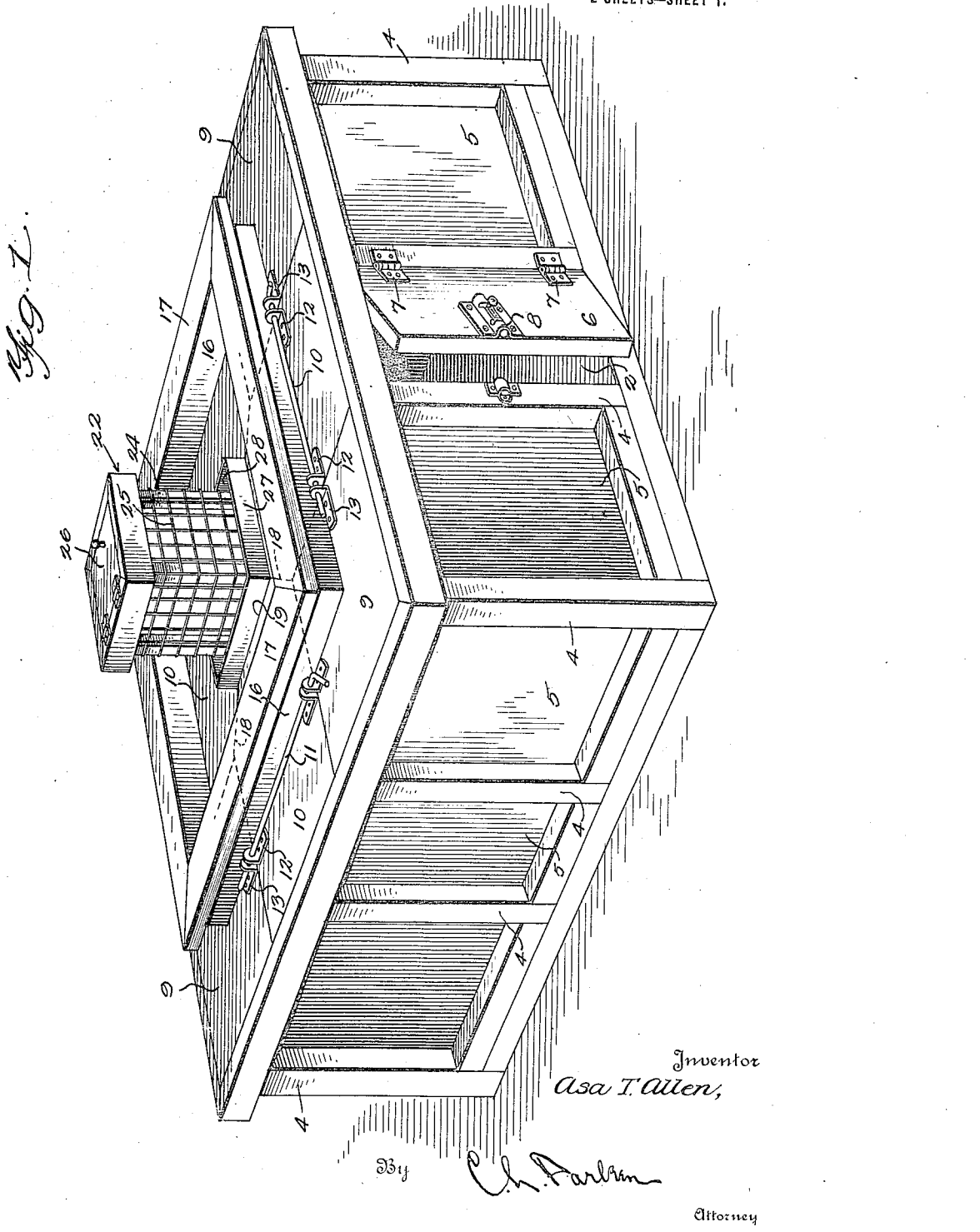

A. T. ALLEN.
ANIMAL TRAP.
APPLICATION FILED SEPT. 6, 1921.

1,435,576.

Patented Nov. 14, 1922.
2 SHEETS—SHEET 1.

Inventor
Asa T. Allen,
By
Attorney

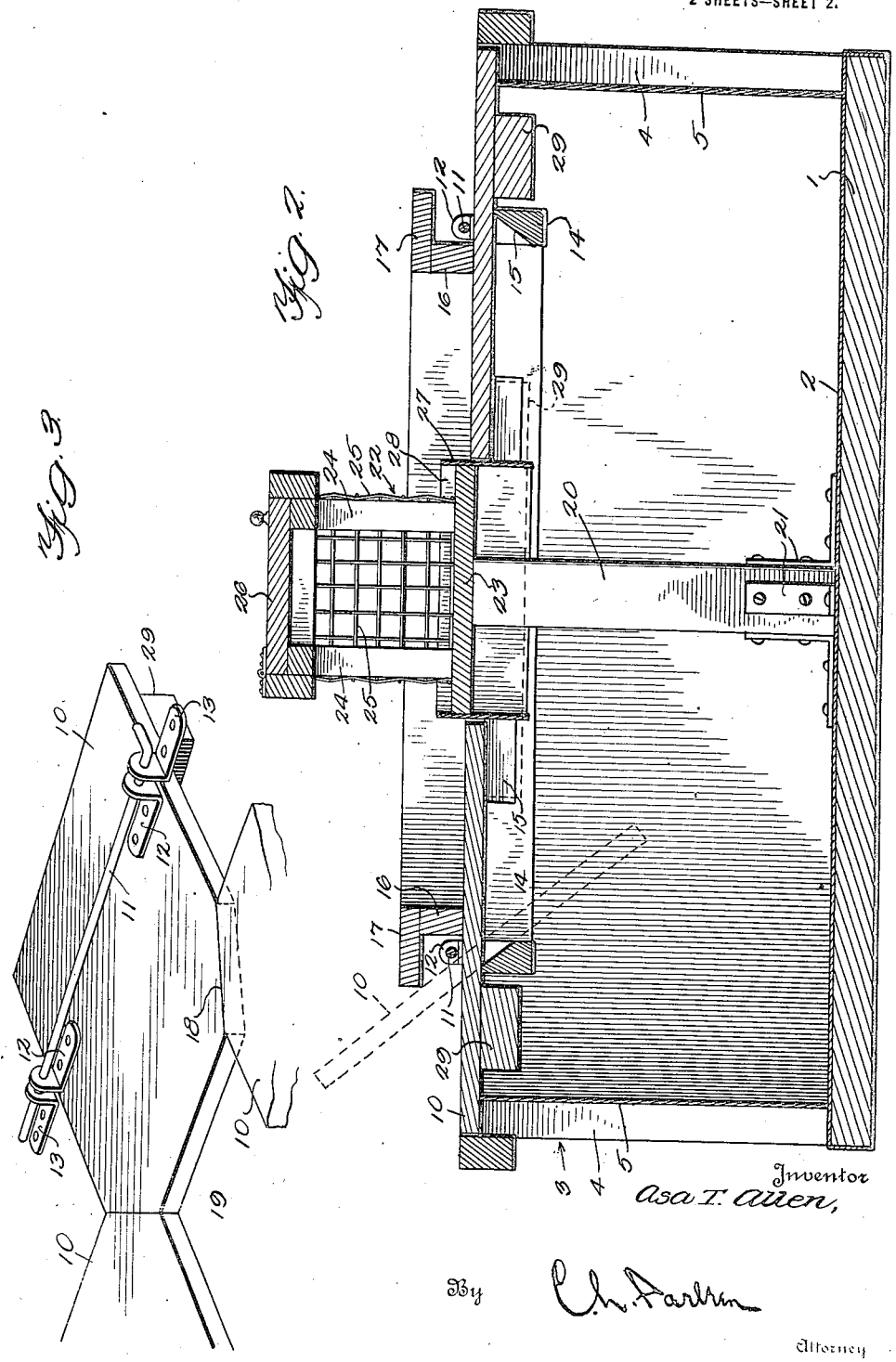

Patented Nov. 14, 1922.

1,435,576

UNITED STATES PATENT OFFICE.

ASA T. ALLEN, OF OCEAN VIEW, VIRGINIA.

ANIMAL TRAP.

Application filed September 6, 1921. Serial No. 498,657.

*To all whom it may concern:*

Be it known that I, ASA T. ALLEN, a citizen of the United States, residing at Ocean View, in the county of Norfolk and State of Virginia, have invented certain new and useful Improvements in Animal Traps, of which the following is a specification.

This invention relates to improvements in animal traps, and more particularly to self-set and everset traps wherein a hinged platform is provided leading to a receptacle, and a trap or receptacle is arranged below the hinged platform.

In the present invention, I provide a rib adjacent a hinge to conceal it and prevent an animal from cautiously approaching the hinge and being frightened away.

In the invention, I further provide a bait receptacle in the form of a coop adapted to receive live bait to attract the animal to be trapped.

In the accompanying drawings, I have shown one embodiment of the invention. In this showing:

Figure 1 is a perspective view of the trap,
Figure 2 is a vertical sectional view, and,
Figure 3 is a detail view of a portion of the hinged floor.

Referring to the drawings, the reference numeral 1 designates the base of the trap which is provided with a metal lining 2. The device is provided with vertical walls 3. As shown, a plurality of spaced vertical posts 4 are secured to the base of the trap and these posts are adapted to support metal plates 5 forming the side walls. A door 6 may be arranged in one side, the door being provided with suitable hinges 7 and being further provided with a lock or catch 8. The top of the trap is formed of four corner sections 9 and the spaces between the four corner sections are provided with hinged sections 10. These hinged sections are secured to the corner sections by means of rods or pins 11 passing through hinged members 12 carried by the hinged sections and similar members 13 carried by the corner sections. A guide strip 14 is arranged on the inside of the trap, secured to the corner sections, and this guide strip is provided with an inclined face 15 which limits the downward movement of the hinged sections (see Figure 2). A ledge or rib 16 extends around the top of the trap, adjacent the hinges, the ledge being secured to the corner sections of the top. As shown, this ledge is provided with a horizontal flange 17 extending over the hinge. The inner ends of the hinged sections are provided with diagonal faces 18, adapted to contact with each other, forming a central space 19.

A post 20 is arranged in the center of the trap, being secured to the base by means of suitable brackets 21. This post is adapted to support the bait receptacle 22 which, as shown, is made in the form of a coop having a bottom 23 to which are secured corner posts 24. The coop is provided with a covering of wire netting 25, and with a suitably hinged top 26. The bottom of the bait receptacle extends slightly beyond the corner posts, and is surrounded by a plate 27 forming a trough 28 for the reception of suitable bait. The hinged sections may be provided with counter weights 29.

In operation, the animal to be trapped is attracted by a live fowl placed in the bait receptacle 22. The animal reaches the top of the trap adjacent the outer edge and starts inwardly. To clear the ledge 16 and the flange 17, it is necessary for the animal to step upwardly before reaching the hinges 11. It has heretofore been proposed to employ concealed hinges to keep the animal from suspecting that an effort is being made to trap it. After the weight of the animal causes the top of the trap to sag adjacent the hinges and when it cautiously approaches over a level surface, it is able to note this sagging and be frightened away. When the animal, however, jumps upon the flange 17 which is rigidly supported on the corner piece 9, there is no tendency to give and when it steps downwardly on the inner portion of the hinged sections, he is immediately trapped.

The provision of a bait receptacle in the form of a coop is also advantageous as the live bait tends to attract animals that would not otherwise be attracted.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. An animal trap comprising a receptacle having a top formed of a plurality of sections hinged intermediate their ends, a ledge arranged on the top of the receptacle adjacent the hinges, and a bait receptacle arranged in the center of the top.

2. A self-set and ever-set trap comprising a receptacle having a top formed of a plurality of sections hinged at a point intermediate the outer edge and the center of the receptacle, a ledge arranged over said hinged sections adjacent the point of support, a flange secured to said ledge, and a bait receptacle arranged in the center of the top.

3. A self-set and ever-set trap comprising a receptacle having a bottom and vertical walls, the top of the receptacle being formed of a plurality of corner sections, and hinged sections, hinges connecting said corner sections and said hinged sections at a point remote from the vertical walls, a ledge secured to said corner sections adjacent said hinges, a flange formed on said ledge and extending over said hinges, and a bait receptacle arranged in said top substantially centrally thereof.

4. A self-set and ever-set trap comprising a bottom and vertical walls and a top, said top being formed of corner sections secured to said vertical walls, hinged sections arranged between said corner sections, hinges connecting said hinged sections to said corner sections, said hinges being arranged at a distance from said vertical walls, a flange secured to said corner sections and disposed adjacent said hinges, a post secured to the bottom of the trap substantially centrally thereof and extending to the top, and a bait receptacle mounted on said post.

5. An animal trap comprising a receptacle including a bottom and side walls, a cover forming the top of said receptacle, said cover being provided with a hinge intermediate its ends, means for normally maintaining said cover in closed position, and a fixed substantially vertical ledge arranged entirely across said cover, the lower edge of said ledge being arranged in proximity to said cover when the latter is in closed position and being disposed adjacent said hinge, said ledge being provided with a substantially horizontal flange extending on opposite sides of the hinge of said cover.

In testimony whereof I affix my signature in presence of two witnesses.

ASA T. ALLEN.

Witnesses:
C. H. SWANN,
HENRY HUNSBERGER.